United States Patent [19]

Purcell

[11] 4,115,974
[45] Sep. 26, 1978

[54] RETAINER ARRANGEMENT FOR PANELS

[76] Inventor: Jack Purcell, 5201 Curtis, Dearborn, Mich. 48126

[21] Appl. No.: 798,071

[22] Filed: May 18, 1977

[51] Int. Cl.² .............................................. E04B 1/38
[52] U.S. Cl. ...................................... 52/512; 296/1 R
[58] Field of Search ................. 52/506, 509, 511, 716, 52/717, 287, 288, 512, 309.16; 296/1 R, 1 S, 31 P, 28 R

[56] References Cited
U.S. PATENT DOCUMENTS

| | | | |
|---|---|---|---|
| 3,338,617 | 8/1967 | Lockwood | 296/1 R |
| 3,448,550 | 6/1969 | Herr et al. | 52/717 X |
| 3,499,622 | 3/1970 | Lugun et al. | 52/288 X |
| 3,580,628 | 5/1971 | Rantala | 296/1 R |
| 3,797,185 | 3/1974 | LaBorde | 52/288 |

Primary Examiner—Price C. Faw, Jr.
Assistant Examiner—Carl D. Friedman
Attorney, Agent, or Firm—Remy J. VanOphem

[57] ABSTRACT

A retainer arrangement is disclosed for securing two or more panels with highly dissimilar coefficients of thermal expansion to an underlying support structure. In automotive applications, for example, the retainer allows the use of body panels of a material such as flexible plastic having a differing coefficient of thermal expansion than the support structure, typically constructed of steel, without inducing distortion, i.e., rippling or buckling of the body panel, as the assemblage is subjected to widely varying temperatures. The retainer comprises a strip mounted to the support structure and is configured to hold an edge of the overlay body panel to perform the retention function, allowing relative linear movement between the retainer and the overlay body panel.

In one embodiment, the retainer strip has a flange portion mounted to an outer fender and also has an extended portion overhanging the flange and adapted to receive an offset edge of the overlying body panel. The retainer, if constructed of plastic, may have a stiffening metal insert strengthening this strip. In a second embodiment, the retainer strip is mounted to an inner fender and includes a portion thereof being formed with a groove which is adapted to receive an edge of an outer fender formed from a dissimilar material.

13 Claims, 4 Drawing Figures

U.S. Patent  Sept. 26, 1978  4,115,974
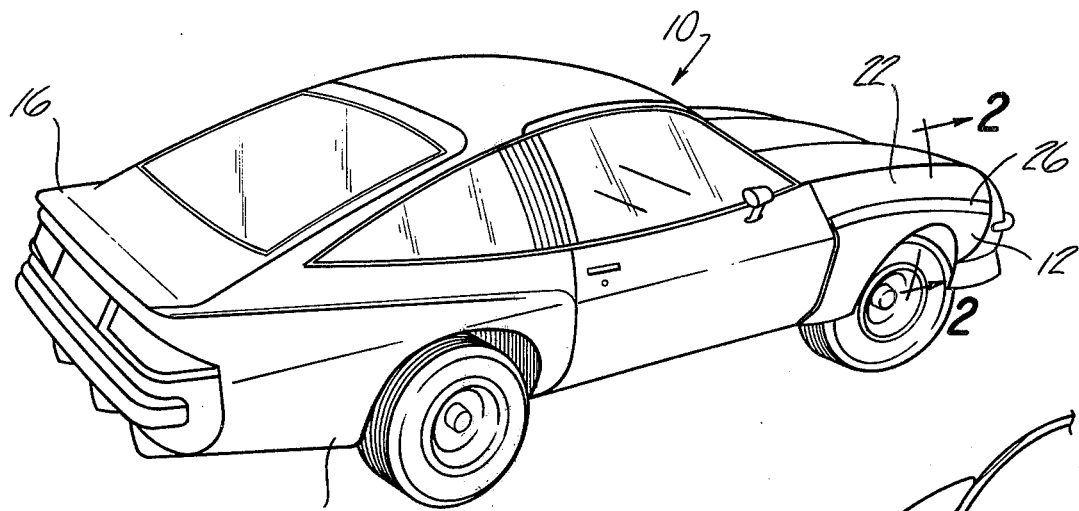
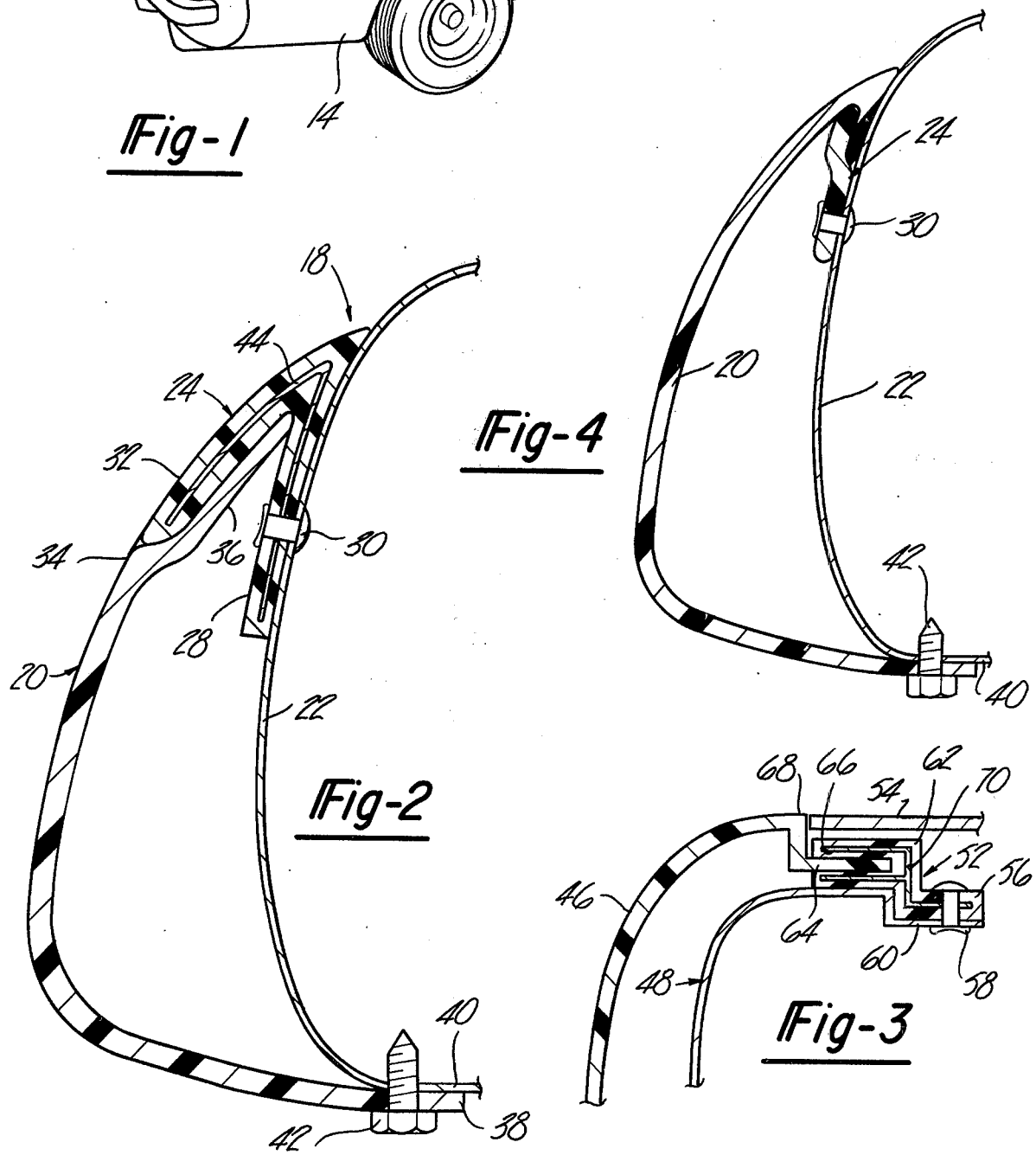

RETAINER ARRANGEMENT FOR PANELS

BACKGROUND OF THE INVENTION

1. Field of the Invention

This invention concerns, in general, retainers for securing two or more panels of highly differing coefficients of thermal expansion, and more particularly, retainers adapted to secure automotive outer body panels to an underlying support structure.

2. Description of the Prior Art

In applications where the aesthetic value of a product plays a dominant function in the marketing of such a product, it has for many years been common practice to utilize underlying structural support members with overlying aesthetically appealing outer panel members. Obvious examples of this are both small and large appliances, small office machines, snowmobiles, as well as automotive panels. In all of these applications, it is becoming increasingly advantageous to utilize light weight, flexible plastic panels installed over steel structural support body members. Utilizing plastic to obtain aesthetically appealing forms is extremely desirable over utilizing metal materials in that not only is it less costly, but the manufacturing problems associated with obtaining the ultimate aesthetic form is considerably easier. One such application is the add-on styling packages currently in use by the major automotive manufacturers, in which items such as fender flares, rear deck spoilers, and front deck lid bonnets are mounted onto existing steel structures or panels to provide a particular styling appeal to the basic lines of the automobile.

The current trend to lighter weight vehicles also renders quite attractive the potential use of light weight plastic or aluminum panels to provide aesthetically appealing outer contours of the vehicle. These panels are mounted over an underlying structure of metal which provides a structural integrity for the vehicle. Further, the increasing public pressure for automotive body panels less subject to damage under minor impact also makes the use of flexible plastic materials for outer body panels an attractive solution to this problem.

However, an ever-existing problem in early design efforts to provide compatible plastic outer panel members with underlying metallic structural members has heretofore remained unsolved. That problem arises from considerably different coefficients of thermal expansion between the materials mentioned above and the steel from which the understructure is usually constructed. That is, in a situation where direct mechanical joining of such a panel of plastic to the steel fender or inner fender, buckling or rippling of the plastic panel occurs as the members undergo a wide variation in temperature. This buckling or rippling becomes totally objectionable at junctures of the plastic panel and the steel member where visible blends occur, such as in the add-on fender flares and the rear deck spoiler mentioned above.

This situation precludes the use of visible mechanical fasteners at the juncture, and the usual approach has involved use of fasteners hidden within the inner panel cooperating with retainer strips or studs which engage an inner lip of the outer panel. Since the fasteners are in a matrix of steel, the spacing of the pressure points applied to the plastic panel thermally "grow" more slowly than the retainer panel, hence the objectionable ripple effect which is aggravated by the remote location of the fasteners from the seam or blend line.

It is an object of the present invention to provide a retainer arrangement in which panel members of materials having greatly dissimilar rates of thermal expansion may be joined without the appearance of unsightly rippling or bulging of the outer panel as the assemblage undergoes substantial temperature variations.

It is a further object of the present invention to provide a retainer arrangement which accommodates physical blends or joints between the respective panels without the need for exposed mechanical fasteners.

It is still a further object of the present invention to provide a retainer arrangement suitable for automotive body panel applications in which an outer panel is joined to an underlying support structure having greatly dissimilar coefficients of thermal expansions.

It is yet another object of the present invention to provide a retainer arrangement suitable for automotive body applications that does not detract from the aesthetic appeal of the vehicle.

It is still a further object of the present invention to provide a retainer arrangement for automotive panels with highly dissimilar coefficients of thermal expansion that is economical to manufacture and aesthetically acceptable.

Yet another object of the present invention is to provide a retainer arrangement for automotive panels of dissimilar coefficients of thermal expansion which makes possible the use of automotive outer body panels less subject to damage under minor impact, as well as contribute to lightening the weight of the over all vehicle.

Further objects and advantages of the invention and the nature of the invention will be clear to those skilled in the art from the succeeding detailed description of the preferred embodiment of the invention and the accompanying drawings thereof.

SUMMARY OF THE INVENTION

These and other objects of the present invention which will become apparent upon a reading of the following specification and claims are accomplished by a retainer arrangement involving a retainer strip secured to the support structure and configured to receive one edge of an overlying panel member to retain the same. In one embodiment the retainer strip extends along the region of the blend between the overlying panel and a support structure such as a fender, and has a flange portion fixed to the support structure and also has a flap portion overhanging from the flange and configured to receive an offset edge of the body panel. In a second embodiment, the retainer strip includes a grooved portion adapted to receive and retain an edge of the overlying panel. In both configurations, the overlying panel is allowed unrestrained thermal growth at the juncture with the retainer strip to eliminate the tendency for buckling and rippling of the overlay panel. The retainer strip is constructed of a similar material as the overlay body panel, and a metallic stiffener insert may be provided in those instances where flexible plastic material is utilized for the retainer strip.

BRIEF DESCRIPTION OF THE DRAWINGS

FIG. 1 is a perspective view of an automobile upon which add-on body panels have been installed with the retainer arrangement according to the present invention.

FIG. 2 is a view of the section 2—2 taken in FIG. 1.

FIG. 3 is a sectional view of an alternate embodiment of the retainer arrangement according to the present invention.

FIG. 4 is a sectional view of still an alternate embodiment of the retainer arrangement according to the present invention.

DETAILED DESCRIPTION OF THE PREFERRED EMBODIMENT

In the following detailed description contained in the following specification and drawings, specific terminology will be utilized for the sake of clarity and a particular embodiment described in accordance with the requirements of 35 U.S.C. 112, but it is to be understood that the same is not intended to be limiting and, indeed, should not be so construed, inasmuch as the concept is capable of many forms and variations within the scope of the appended claims.

Referring to the drawings, FIGS. 1 and 2 depict the application of the retainer arrangement according to the present invention to add-on or restyling panels to an automobile 10 such as fender flares 12 and 14, and a spoiler 16 such as are currently used to restyle an existing car design to have more aesthetic impact in sporty versions of manufacturer's models. In this application, the retainer arrangement 18 according to the present invention is used to secure the upper edge of a flexible plastic overlay body panel 29 to an understructure comprised of the outer fender 22 which would usually be constructed of steel.

The retainer arrangement 18 is comprised of a retainer strip 24 extending along and constituting the blend area 26 between the overlay panel 20 and the outer fender 22. The retainer strip 24 is shown as constructed of a suitable plastic material such as is used in the construction of the overlay body panel 20 and includes a flange portion 28 abutting the surface of the outer fender 22, and securely fastened thereto by a conventional means, such as a series of rivets 30.

A reversely extending retention flap 32, overhanging from and integral with the flange portion 28, is also provided which has an outer configuration such as to provide the blend area 26 and to be smoothly continuous with the outer surface 34 of the overlay panel 20.

The overlay body panel 20 is secured along its upper portion thereof by an offset tab edge portion 36 adapted to be received and thereby trapped beneath the flap 32. The flap 32 would be advantageously formed at a more acute angle with the flange portion 28 in its relaxed state, and then forced outwardly by insertion of the tab edge portion 36 to insure a tight fit therebetween.

The degree of offset is that sufficient to present a smooth flow of contour between the flap 32 and the main portion of the overlay body panel 20 as shown.

The lower edge 38 of the overlay panel 20 is securely fastened to a flange portion 40 of the outer fender 22 by means of a series of fasteners such as sheet metal bolts 42 as shown, since this region is not normally visible, and hence the use of mechanical fasteners is not aesthetically objectionable.

Contrariwise, the upper or normally visible juncture between the body panel 20, including the flap 32 of the retainer strip 18 is highly visible, but the fasteners 30 are not open to view, and the effect is of clean flowing lines and blends to maximize the aesthetic appeal of the addition of the overlay body panel 20.

A stiffener insert 44 may be molded within the retainer strip 24 to add stiffness and strength thereto if required, and advantageously, this may be constructed of aluminum since it has a similarly large coefficient of thermal expansion.

It has been discovered that the relative disjointing of the upper portion of the overlay body panel 20 and the points of securement to the underlying structure here constituted by the outer fender 22 by the provision of the retainer strip 24 eliminates the ripple or pucker which has formerly been a problem at the panel juncture as described above. This is because the thermal expansion experienced by the relatively large area of the overlay body panel 20 in not transmitted into the region of the fasteners as was heretofore the case. Rather, thermal expansion is allowed to take place in the overlay body panel 20 unrestrained by the fasteners 30.

A second embodiment of the retainer arrangement according to the present invention is shown in FIG. 3. This embodiment is directed to the application of the retainer arrangement according to the present invention to the mounting of an outer fender 46 to an inner fender 48 of an automotive body.

The retainer arrangement 60 in this embodiment includes a retainer strip 52 positioned beneath the hood panel or front deck lid 54, secured to the inner fender 48 along a flange portion 56 by fastening means comprised of a plurality of rivets 58 passing through the flange portion 56 and an offset portion 60 of the inner fender 48.

The outer fender 46 is retained within a forward portion 62 of the retainer strip 52 by seating of an offset upper edge 64 of the outer fender 46 within a groove 66 formed in the forward portion 62. The lower portion of the outer fender 46 may be secured in any conventional manner.

The offset, in this case, is of a degree such as to place the upper surface 68 of the outer fender 46 flush with the hood panel 54 as shown.

As in the first embodiment, a metallic stiffener insert 70 may be provided, in this instance including a forked portion extending on either side of the groove 66.

It can be appreciated that this arrangement effectively isolates the thermal "growth" of the outer fender 46 from the point of attachment to the inner fender 48 by virtue of the tab-in slot securement of the outer fender to the retainer strip 52.

A further alternate embodiment of the retainer arrangement according to the present invention is shown in FIG. 4. This embodiment is directed also to an add-on panel 20 to the inner panel 22. In this case, however, the add-on panel is mounted over the retainer strip 24. The retainer strip is secured to the inner panel by any convenient means such as rivets 30.

While this new concept has been described in connection with automotive body panels, and specifically with plastic and aluminum mounted to steel, the retainer arrangement described is applicable to other applications having the same or similar requirements of isolation of thermal growth between joined members.

While only the preferred embodiments of the invention have been disclosed, it will be apparent to those skilled in the art that changes may be made to the invention as set forth in the appended claims and, in some cases, certain features of the invention may be used to advantage without corresponding use of other features. Accordingly, it is intended that the illustrative and descriptive materials herein be used to illustrate the principles of the invention and not to limit the scope thereof.

What is claimed is:

1. A retainer arrangement for securing a plastic overlay panel to a metallic support structure, said plastic overlay panel and metal support structure being constructed of materials having substantially dissimilar rates of thermal expansion, comprising:
   a continuous plastic retainer strip extending along said metallic support structure;
   means for fastening said plastic retainer strip to said metallic support structure;
   said plastic retainer strip having a portion for receiving an edge of said plastic overlay panel trapping said plastic overlay panel edge therein, said trapped edge of said plastic overlay panel being contour blended with said metallic support structure to create a highly visible seam with said metallic support structure; and
   means for mounting at least one other edge of said plastic overlay panel to said metallic support structure, whereby said trapped plastic edge may freely expand relative to said metallic support structure to accommodate thermal growth and thereby eliminate distortions at said highly visible seam of said plastic overlay panel imposed by connection to said support structure.

2. The retainer arrangement according to claim 1 wherein said continuous plastic retainer strip includes a flange portion and wherein said means for fastening said continuous retainer strip to said metallic support structure comprises means for securing said flange portion to said metallic support structure.

3. The retainer arrangement according to claim 2 wherein said portion of said continuous retainer strip comprises a flap overlay portion extending reversely to said flange portion and adapted to receive said edge of said plastic overlay panel beneath said flap portion to thereby trap said overlay panel edge.

4. The retainer arrangement according to claim 3 wherein said plastic overlay panel edge is offset so as to create a smooth outer contour in conjunction with the flap portion of said plastic retainer strip.

5. The retainer arrangement according to claim 3 wherein said continuous plastic retainer strip further includes a metallic stiffener insert.

6. The retainer arrangement according to claim 2 wherein said continuous plastic retainer strip portion receiving said edge of said plastic overlay panel comprises a grooved portion thereof extending along said continuous retainer strip, said grooved portion adapted to receive said edge of said plastic overlay panel.

7. The retainer arrangement according to claim 6 wherein said continuous plastic retainer strip further includes a metallic stiffener insert.

8. A panel assembly for an automobile comprising:
   a plastic overlay panel partially extending over a steel body panel of said automobile;
   means for mounting said plastic overlay panel to said steel body panel, said means including a continuous plastic retainer strip extending along a juncture between said plastic overlay panel and said steel body panel, said continuous plastic retainer strip including a portion configured to receive an edge of said overlay panel and trap the same to thereby retain said overlay panel with respect to said continuous plastic retainer strip, said trapped edge of said plastic overlay panel being contour blended with said steel support structure to create a highly visible seam with said steel support structure; and
   fastener means fastening said continuous retainer strip to said steel body panel, whereby said continuous plastic retainer strip secures said edge to said steel body panel while accommodating differential thermal growth rates therebetween.

9. The panel assembly according to claim 8 wherein said continuous plastic retainer strip includes a flange portion and wherein said means fastening said retainer strip to said steel body panel comprises means securing said flange portion to said steel body panel.

10. The panel assembly according to claim 9 wherein said portion of said continuous plastic retainer strip comprises a flap portion extending reversely to said flange portion and is adapted to receive said edge of said plastic overlay panel beneath said flap portion to thereby trap said plastic overlay panel edge.

11. The panel assembly according to claim 9 wherein said plastic overlay panel edge is offset so as to create a smooth outer contour in conjunction with the flap portion of said retainer strip.

12. The panel assembly according to claim 8 wherein said continuous plastic retainer strip further includes a metallic stiffener insert.

13. The panel assembly according to claim 8 wherein said plastic overlay panel extends both over normally visible and normally not visible portion of said automobile steel body panel and wherein said continuous plastic retainer strip extends along the visible juncture therebetween, and wherein said means mounting said plastic overlay panel to said steel body panel further includes fastener means directly securing a portion of said plastic overlay panel to said steel body panel in a region where said overlay panel is normally not visible.

* * * * *